(12) United States Patent
Goslin et al.

(10) Patent No.: US 11,134,034 B2
(45) Date of Patent: Sep. 28, 2021

(54) SYSTEMS, METHODS, AND STORAGE MEDIA CONFIGURED TO INTEGRATE ARTIFICIAL INTELLIGENCE CHATBOTS INTO A COMMUNICATION BETWEEN REAL-WORLD USERS

(71) Applicant: Disney Enterprises, Inc., Burbank, CA (US)

(72) Inventors: Michael P. Goslin, Burbank, CA (US);
Eric C. Haseltine, Burbank, CA (US);
Timothy M. Panec, Burbank, CA (US);
Jason Yeung, Burbank, CA (US);
Hunter Gibson, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/564,505

(22) Filed: Sep. 9, 2019

(65) Prior Publication Data
US 2021/0075747 A1 Mar. 11, 2021

(51) Int. Cl.
*H04L 12/58* (2006.01)
(52) U.S. Cl.
CPC .................... *H04L 51/02* (2013.01)
(58) Field of Classification Search
CPC ..... H04L 51/046; G06F 3/048; G06F 3/04817
USPC ......................................................... 709/206
See application file for complete search history.

(56) References Cited

U.S. PATENT DOCUMENTS

| | | | |
|---|---|---|---|
| 9,043,196 B1* | 5/2015 | Leydon ............... | G06F 3/04842 704/4 |
| 9,213,940 B2 | 12/2015 | Beilby | |
| 10,162,816 B1 | 12/2018 | Banerjee | |
| 10,180,988 B2 | 1/2019 | Allen | |
| 10,587,745 B2* | 3/2020 | Kim ....................... | G06Q 50/01 |
| 10,698,587 B2* | 6/2020 | Paek ...................... | G06F 3/0485 |
| 2014/0189027 A1* | 7/2014 | Zhang ..................... | H04L 51/02 709/206 |
| 2015/0222576 A1* | 8/2015 | Anderson ................ | G06F 1/16 715/752 |
| 2015/0341304 A1* | 11/2015 | Sherman ............... | H04L 67/306 709/206 |
| 2016/0294739 A1 | 10/2016 | Stoehr | |

(Continued)

FOREIGN PATENT DOCUMENTS

KR 20180019869 2/2018

OTHER PUBLICATIONS

Seering et al., "Beyond Dyadic Interactions: Considering Chatbots as Community Members", CHI 2019, May 4-9, 2019, Glasgow, Scotland UK. (Year: 2019).*

(Continued)

*Primary Examiner* — Backhean Tiv
*Assistant Examiner* — Jonathan A Sparks
(74) *Attorney, Agent, or Firm* — Esplin & Associates, PC (57) ABSTRACT

The systems and methods presented herein describe integrating artificial intelligence chatbots into a communication between real-world users. A context of a shared communication session between the real-world users may be determined. In response to a user selection, a contextually relevant communication may be presented in communication session. The contextually relevant communication may be responsive to the context of the communication session and/or may convey a persona of an entity, such as a movie character.

18 Claims, 5 Drawing Sheets

(56) References Cited

U.S. PATENT DOCUMENTS

2018/0367483 A1* 12/2018 Rodriguez .............. H04L 51/04
2021/0035239 A1* 2/2021 Srivastava .............. H04L 51/18

OTHER PUBLICATIONS

"From Eliza to Xiaolce: challenges and opportunities with social chatbots", Shum et al., Microsoft Corporation, Frontiers of Information Technology & Electronic Engineering, 2018. (Year: 2018).*
Thomas McMullan, Medium Corporation, Artificial Intelligence Will Kepp Our Loved Ones Alive;Sep. 20, 2018 [https://adeshpande3.github.io/How-I-Used-Deep-Learning-to-Train-a-Chatbot-to-Talk-Like-Me]; 8 pages.
Adit Deshpande, How I Used Deep Learning to Train a Chatbot to Talk Like Me (Sorta); Jul. 25, 2017 [https://medium.com/s/story/artificial-intelligence-will-keep-our-loved-ones-alive-replika-ai-bot-google-duplex-2dc02eec55dc]; 20 pages.
Startacus Admin, Replika—The AI chatbot that learns to mimic . . . You; Mar. 27, 2017 [https://startacus.net/culture/replika-the-ai-chatbot-that-learns-to-mimic-you#.XL24YJgzY2w], 5 pages.
The Byte; Wow! This Bot Passed the Turing Test by Simulating a Dude on Tinder, Sep. 7, 2018.

* cited by examiner

SYSTEMS, METHODS, AND STORAGE MEDIA CONFIGURED TO INTEGRATE ARTIFICIAL INTELLIGENCE CHATBOTS INTO A COMMUNICATION BETWEEN REAL-WORLD USERS

FIELD OF THE DISCLOSURE

This disclosure relates to systems, methods, and storage media configured to integrate artificial intelligence chatbots into a communication between real-world users.

BACKGROUND

A chatbot may comprise a computer program configured to carry out a conversation, textual and/or auditory. Chatbots may be designed to simulate how a human would behave. Chatbots may utilize particularized dialog systems for various practical purposes including customer service. Some chatbots may use natural language processing systems, while others may scan for keywords within a user input and provide a predetermined reply.

SUMMARY

One aspect of the disclosure relates to a system configured to integrate artificial intelligence chatbots into a communication between real-world users. Inside a conversation in a messenger application, chatroom environment, and/or other communication platform, users may insert "conversation buddies" representing chatbots that may intelligently react to things that are said. Individual chatbots may be associated with personas that assess a current state of a conversation and remember things that are said so that it may give replies that reflect the personas. These personas may be representative of movie characters, cartoon characters, game characters, real-world people, and/or other personas. Reactions by the users to certain responses in various contexts may be used as training data for a particular chatbot. As a result, individual chatbots may be specifically catered to a group of users and/or conversation.

In some implementations, a system may include one or more hardware processors, which may be configured by machine-readable instructions to provide a messaging interface for presentation via a first computing platform associated with a first user. The messaging interface may include one or more of an entry field, a communication field, and/or other components. The entry field may display messaging content available for entry and/or selection by the first user. The messaging content may include one or more of alpha-numeric characters, photos, videos, GIFs, icons representing chatbots, and/or other content. The communication field may display a shared messaging feed that reflects a communication session between the first computing platform and one or more other computing platforms. The one or more other computing platforms may include second computing platform associated with a second user.

The one or more hardware processors may be configured by machine-readable instructions to determine context information and/or other information. The context information may describe a context of the communication session and/or other information.

The one or more hardware processors may be configured by machine-readable instructions to obtain a selection of a first messaging icon via the entry field. The first messaging icon may represent a first chatbot having a first persona.

The one or more hardware processors may be configured by machine-readable instructions to, in response to obtaining the selection of the first messaging icon, determine a contextually relevant communication based on one or more of the context information, the first persona, and/or other information.

The one or more hardware processors may be configured by machine-readable instructions to effectuate presentation of the contextually relevant communication in the communication field. The presentation may cause an update of the shared messaging feed such that the contextually relevant communication may be presented in the shared messaging feed as shown on the first computing platform, the second computing platform, and/or other computing platforms included in the communication session.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
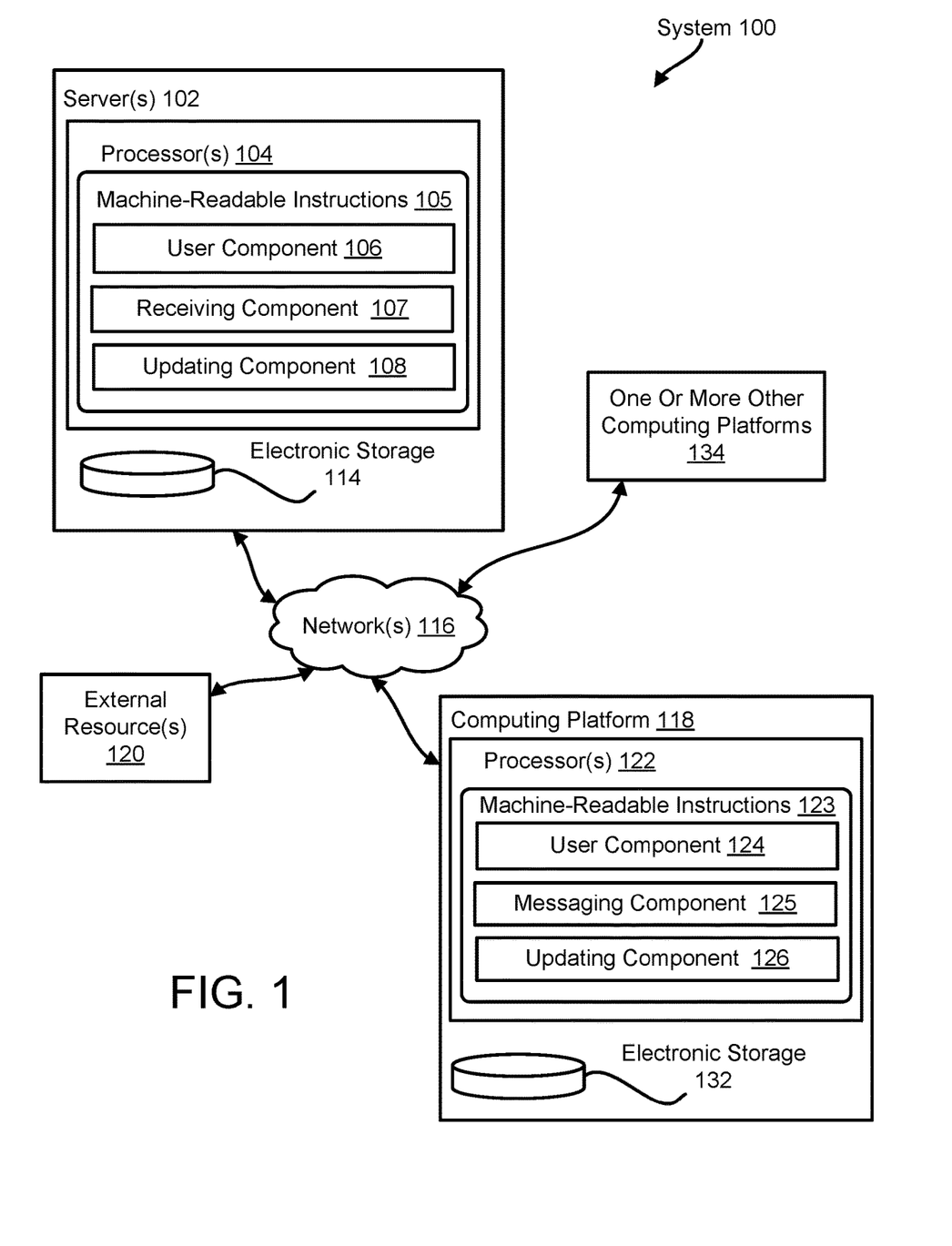
FIG. 1 illustrates a system configured to integrate artificial intelligence chatbots into a communication between real-world users, in accordance with one or more implementations.

FIG. 1 illustrates a system 100 configured to integrate artificial intelligence (AI) chatbots into a communication between real-world users, in accordance with one or more implementations. An AI chatbot may comprise a computer program configured to carry out a conversation. An AI chatbot may be associated with a visual representation, such as a graphic icon, sticker, and/or other visual representation. An AI chatbot may be associated with a persona such that replies may reflect the persona. In some implementations, a persona may be representative of one or more of a movie character, a cartoon character, a game character, a real-world person, and/or other personas. When integrated, an AI chatbot may comment on a conversation, may focus on the latest messages (e.g., prioritizing the most recent message), may answer questions, may carry out functions, and/or may provide other communications. In some implementations, an AI chatbot may comment on a conversation as an occasional "guest" in the conversation. In some implementations, an AI chatbot may be communicated with directly by mentioning the chatbot's persona in a message. A direct communication may provide a technique to address a question to the AI chatbot. In some implementations, an AI chatbot's integration may be stopped by providing input to remove a chatbot icon/message off screen.

The system 100 may include one or more of servers(s) 102, computing platform 118, one or more other computing platforms 134, and/or other components. Communication sessions between users may be presented via messaging interfaces of messaging applications. A messaging interface may be presented on computing platform 118 and/or individual ones of one or more other computing platforms 134. It is noted that although descriptions of features and/or functionality of the system 100 presented herein may be directed to computing platform 118, this is for illustrative purposes only and not to be considered limiting. For example, individual ones of the one or more other computing platforms 134 may be similarly configured and/or include the same or similar components as computing platform 118.

In some implementations, communication sessions between computing platforms may be established over one or more networks 116. The network(s) 116 may include, for example, the Internet, a cellular network, local area network, and/or other networks. In some implementations, a host may route messaging content communicated between computing platform in accordance with the communication sessions. The host may include, for example, server(s) 102 and/or other host.

Computing platform 118 may include one or more of a cellular telephone, a smartphone, a laptop, a tablet computer, a desktop computer, a television set-top box, smart TV, a gaming console, a client device, and/or other device suitable for the intended purpose(s) presented herein.

In some implementations, execution of a messaging application may be facilitated by information exchange among one or more of computing platform 118, server(s) 102, and/or other entities. By way of non-limiting example, information defining the messaging application and/or operations of the messaging application may be provided to the computing platform 118 based on information determined at server(s) 102. For example, the server(s) 102 may serve information describing functions, features, views of an interface of the messaging application, and/or other information to the computing platform 118 according to client/server architecture. The computing platform 118 may present views of the interface at a display of the computing platform 118 based on the information received from server(s) 102 and/or other information.

In some implementations, information defining the messaging application and/or operations of the messaging application may be provided to the computing platform 118 based on information determined locally at the computing platform 118. For example, the computing platform 118 may store machine-readable instructions 123 which, when executed, determine information describing functions, features, and/or views of an interface of the messaging application, and/or other information associated with the messaging application. The computing platform 118 may be configured to assemble and/or present views of the interface in displays of the computing platform 118 based on the locally determined information, and/or other information. In some implementations, the messaging application may operate on the computing platform 118 based on a combination of information received from server(s) 102, information determined locally at the computing platform 118, and/or other information.

It is noted that descriptions directed to "a" computing platform, a "first" computing platform, a "second" computing platform, and/or other computing platform are to be understood as being descriptions for any one of the one or more computing platform 118 included in the system. For example, descriptions of configurations of computing platform 118 may be directed to a single recitation of "the" or "a" computing platform for clarity.

The computing platform 118 may include one or more physical processors 122 configured to execute machine-readable instructions 123. The machine-readable instructions 123 may be stored in electronic storage 132 of the computing platform 118, and/or other storage location. The electronic storage 132 may include, for example, non-transitory computer-readable storage media. The machine-readable instructions 123 may include one or more of a user component 124, a messaging component 125, an updating component 126, and/or other components. The machine-readable instructions 123 may be executable by the computing platform 118 to facilitate interactions with messaging applications via messaging interfaces.

In some implementations, one or more portions of the machine-readable instructions 123 may comprise information downloaded to the computing platform 118. By way of non-limiting example, the computing platform 118 may download at least part of the machine-readable instructions 123 from the server(s) 102, an external resource 120, and/or other sources. For example, the machine-readable instructions 123 may be downloaded to the computing platform 118 as part of a third-party messaging application (e.g., an "app"). The computing platform 118 may obtain the machine-readable instructions 123 in other ways.

In some implementations, the user component 124 may be configured to access and/or manage one or more user profiles and/or user information associated with users of computing platform 118. The one or more user profiles and/or user information may include information stored by computing platform 118, server(s) 102, one or more other computing platforms 134, and/or other storage locations. The user profiles may include, for example, information identifying users (e.g., a username or handle, a number, an identifier, and/or other identifying information) within the messaging application and/or communication session, security login information (e.g., a login code or password), subscription information, relationship information (e.g., information related to relationships between users in the messaging application), usage information (e.g., a login history indicating the frequency and/or number of times the user logs-in to the user accounts), demographic information associated with users, communication history, information stated by users, browsing history of users, a computing platform identification associated with a user, a phone number associated with a user, and/or other information related to users. The communication history may include content previously entered and/or selected by a user of computing platform 118 into one or more communication sessions.

In some implementations, the messaging component 125 may be configured to effectuate presentation of a messaging interface on a display of the computing platform 118. The messaging interface may include one or more of an entry field, an assembly field, a communication field, and/or other fields.

The entry field may be configured to display messaging content available for entry and/or selection by users. Messaging content may include one or more of text, an image, a video, audio, one or more graphical icons (also referred to herein as "messaging icon"), and/or other content. Text may include one or more of alphanumeric characters, symbols, and/or characters of one or more other writing systems. Images may include photographs, pictures, and/or images. Graphical icons may include one or more of an emoticon, an emoji, a sticker, and/or other graphical icons.

In some implementations, an emoticon may comprise a set of text characters and/or symbols arranged to resemble an image (e.g., a face, a picture, and/or other image). In some implementations, an emoji may comprise an ideograph and/or other graphic symbol. In some implementations, emoticons may correspond to one or more emojis. By way of non-limiting example, entry and/or selection of an emoticon via the entry filed may result in a corresponding emoji being presented in a messaging feed.

In some implementations, messaging component 125 may be configured to facilitate downloading a chatbot keyboard to computing platform 118. The chatbot keyboard may include a graphical representation of a physical keyboard such that entry occurs by touching areas of the keyboard using a touchscreen. The chatbot keyboard may include graphical icons representing a set of chatbots (also referred to as "chatbot icons") as described herein. A chatbot icon may include one or more of an emoticon, an emoji, a sticker, and/or other content having the features and/or functionality of an AI chatbot in accordance with the present disclosure. Accordingly, a chatbot icon may include a graphical icon having features and/or functionality that may be different from conventional graphical icons.

In some implementations, a chatbot icon may be associated with a persona. In some implementations, a persona may be representative of one or more of a movie character, a cartoon character, a game character, a real-world person, and/or other personas. A chatbot icon may have a visual representation representative of a persona associated with the chatbot icon. In some implementations, a persona may include a demeanor. By way of non-limiting illustration, a persona may include one or more of "cute but not bright," "easily become happy/sad/frustrated," "extreme mood-swing reactions," "funny," "snarky," "rude," "angry," and/or other demeanors.

In some implementations, the chatbot keyboard may be downloaded from server(s) 102 and/or other locations. The chatbot keyboard may be downloaded as a component of an application that is downloaded to the given computing platform 118. The chatbot keyboard may be downloaded as a separate component. The chatbot keyboard may be available as a selectable option from among several keyboards available for use on computing platform 118. The chatbot keyboard may include messaging content that is otherwise unavailable for entry and/or selection by an entry field of a messaging interface. For example, the chatbot keyboard may include messaging content that is not available on a standard keyboard of a messaging application that is native to the computing platform 118 and/or messaging application.

An entry field may include one or more messaging content types available for entry and/or selection by users. In some implementations, the entry field may include one or more pages, tabs, windows, and/or portions that allow a user to choose among various available content types and/or entry and/or selection methods. In some implementations, the entry field may include one or more messaging content types within a single display that may be available for entry and/or selection (e.g., a display including different emojis, icons, text, and/or messaging content).

In some implementations, text-type messaging content may be entered and/or selected via a keyboard (e.g., a standard keyboard, a native keyboard, a chatbot keyboard, and/or other keyboards), voice input, and/or other user input method.

In some implementations, graphical icon-type messaging content may be entered and/or selected by providing input into the entry field corresponding to a displayed location of the graphical icons. By way of non-limiting example, an entry field may display an array, grid, and/or other display of various graphical icons. A user may select a given graphic icon by one or more available input mechanisms. Input mechanisms may include, for example, physical interface elements (e.g., depressible buttons, keys, and/or other elements), a touch-sensitive display, an input device included in or coupled with the computing platform 118 (e.g., a mouse, a joystick, keyboard, and/or other device), gesture recognition input, voice input, and/or other input mechanism. By way of non-limiting example, a user may hover a cursor over a display of a graphical icon and select the icon using an input mechanism (e.g., clicking a mouse button). By way of non-limiting example, a user may finger-tap a portion of a touch-sensitive display that shows a desired graphical icon.

In some implementations, a user may select a graphical icon using text-based entry. By way of non-limiting example, a user may input a textual portrayal of a graphic icon (e.g., emoticon) into the assembly field using symbols present on a keyboard. When the user submits the input (e.g., selects a "send" option), the communication field may be updated to include a corresponding graphical icon.

In some implementations, an assembly field may reflect messaging content entered and/or selected from the entry field. The assembly field may show an assembly of the entered and/or selected messaging content based on sequential entry and/or selection of the messaging content by a user. In some implementations, the assembly field may be configured to perform one or more functions of the messaging application including automatic spelling corrections (e.g., "autocorrect"), word predictions, and/or other features and/or functions.

In some implementations, a communication field may display a shared messaging feed that reflects a communication session between the computing platform 118 and one or more other computing platforms 134. The shared messaging feed may include messaging content previously entered and/or selected by a user of the computing platform 118 and/or other users of one or more other computing platforms 134. In some implementations, the shared messaging feed may be updated based on entry and/or selection of messaging content by the user via the entry field and/or based on entry and/or selection of a "send" interface element included in the assembly field. In some implementations, user entry and/or selection of messaging content from the entry field may automatically update the shared messaging feed based on the entries and/or selections. In some implementations, entry and/or selection of messaging content from the entry field may first be reflected by instances of the messaging content appearing in an assembly area of the assembly field (e.g., as a preview). The shared messaging feed may be updated to include messaging content based on entry and/or selection of an interface element included in the assembly field (e.g., a selectable element labeled "send," and/or other term).

Messaging content entered and/or selected by the various users and/or AI chatbots participating in the communication session may be distinguished by separating messaging content within the shared messaging feed and/or otherwise distinctively associating messaging content with the appropriate user and/or AI chatbot that submitted the content. By way of non-limiting example, users and/or AI chatbots may be represented by identifying text, avatars, and/or graphical icons shown in the shared messaging feed. Messaging content entered and/or selected by individual ones of the users and/or AI chatbots may be displayed in separate chat bubbles that are connected to and/or otherwise distinctively associated with visual representations in the shared messaging feed.

In some implementations, incoming messaging content may cause one or more previously entered and/or selected content displayed in the shared messaging feed to scroll to a new position within the shared messaging feed to make room for the incoming content. In some implementations, icons presented in messaging feeds may be displayed the same as or similar to other messaging content (e.g., text content) presented in a feed (e.g., icons may also scroll within the shared messaging feed based on new content being introduced into the feed). Messaging feeds may present messaging content in other ways.

In some implementations, the entry and/or selection of messaging content may update a shared messaging feed displayed in the communication field of the messaging interface. In some implementations, the entry and/or selection of messaging content may facilitate updates of messaging feeds displayed on one or more other computing platforms 134 associated with a communication session, and/or may facilitate other operations.

The messaging component 125 may be configured to determine context information and/or other information. The context information may describe a context of the communication session and/or other information. In some implementations, the context of the communication session may include one or more of words, names, phrases, questions, answers, conveyed emotions, user presence, user absence, and/or other information. The context information may describe a context of the communication session including one or both of communications entered and/or selected by users and/or communications determined for individual chatbots. In some implementations, the context information may be determined through one or more artificial intelligence techniques. One or more artificial intelligence techniques may include natural-language processing, conversational artificial intelligence, virtual assistant artificial intelligence, and/or other techniques.

Words may include individual words and/or combinations of words. A word may include a string of alphanumeric characters, a slang word, an abbreviation, and/or other considerations. Names may include one or more of surnames, given names, nicknames, usernames, handles, and/or other considerations of names. Individual names may be associated with one or more of users participating in a communication session, users previously participating in a communication session, names of known or popular individuals (e.g., celebrities, characters, historical figures, and/or other known or popular individuals), names associated with individual chatbots currently integrated into a communication session, names associated with individual chatbots previously integrated into a communication session, names associated with individual chatbots not yet integrated into a communication session, and/or other considerations of names. A phrase may include a string of words forming one or more thoughts, one or more points, one or more questions, one or more answers, one or more emotions, and/or other considerations. A question may be derived from words, phrases, individual alphanumeric characters, emoticons, and/or other content. A question may elicit an answer-response from user(s) in a communication session. An answer may be derived from words, phrases, individual alphanumeric characters, emoticons, and/or other content. An answer may be related to a question. Emotion may be derived from words, phrases, individual alphanumeric characters, emoticons, and/or other content. User presence and/or absence may refer to one or more of an amount of user engagement in a communication, a frequency of a user is engaging in a communication session, a time between user participation in a communication session, and/or other considerations.

The updating component 126 may be configured to receive entry and/or selection of messaging content from a user via a messaging interface presented via messaging component 125. By way of non-limiting example, the updating component 126 may be configured to receive entry and/or selection of messaging content via one or more input mechanisms included in or coupled to the computing platform 118.

In some implementations, the updating component 126 may be configured to update a shared messaging feed of a communication field presented on the computing platform 118. The shared messaging feed may be updated to present instances of messaging content. By way of non-limiting example, a user may select a graphical icon from an entry field of the messaging interface. The shared messaging feed may be updated to include an instance of the graphical icon.

In some implementations, the updating component 126 may be configured to update a messaging feed presented on the computing platform 118 to include messaging content entered and/or selected by one or more other users of one or more other computing platforms that share a communication session with the computing platform 118, and/or messaging content determined by updating component 126. By way of non-limiting example, the updating component 126 may be configured to receive information describing messaging content. The updating component 126 may be configured to determine the messaging content entered and/or selected by the other users and present instances of the messaging content in the shared messaging feed. In some implementations, the received information may include information identifying the user and/or computing platform associated with the user who entered and/or selected the messaging content. The updating component 126 may be configured to update a messaging feed such that incoming messaging content may be presented in accordance with an appropriate sending user.

In some implementations, the updating component 126 may be configured to communicate information describing the messaging content entered and/or selected by a user of the computing platform 118 and/or other messaging content to facilitate updating messaging feeds of computing platforms sharing a communication session. The communicated information may include information identifying one or both of the sending computing platform, a user associated with the entry and/or selection, and/or other entity.

In some implementations, the updating component 126 may send and/or receive information over network 116. In some implementations, the information sent and/or received by the updating component 126 may include information routed to and/or from the server(s) 102, external resource 120, and/or other entities. In some implementations, information sent and/or received by the updating component 126 may include information routed to and/or from a cell network and/or corresponding entities, a local area network and/or corresponding entities, and/or other networks and/or entities.

The updating component 126 may be configured to, in response, to obtaining the selection of one or more chatbot icons, determine one or more contextually relevant communications. A contextually relevant communication may be determined based on one or more of context information, individual personas associated within individual chatbot icons, individual visual representations of the individual personas, and/or other information. In some implementations, a contextually relevant communication may include one or more of a message (e.g., text-based message), a visual representation of the chatbot icon, and/or other content. The message may be responsive to the context of the communication session. The message may respond to, expand upon, and/or question the context of the communication session. The message may convey a persona. By way of non-limiting illustration, a message may be configured to convey a demeanor associated with the persona. In some implementations, a contextually relevant communication may be determined through one or more artificial intelligence techniques. One or more artificial intelligence techniques may include natural-language processing, conversational artificial intelligence, virtual assistant artificial intelligence, machine-learning, and/or other techniques.

In some implementations, one or more contextually relevant communications may be determined without prompting from one or more users of a communication session. By way of non-limiting illustration, without further prompting by the user, one or more contextually relevant communications may be determined to be added in a conversation. In this manner, an AI chatbot may comment on a conversation as an occasional "guest" in the conversation.

In some implementations, one or more contextually relevant communications may be determined and presented based on one or more of a presentation frequency, a presentation amount, a deselection of a messaging icon by a user conveying a removal of a chatbot from a shared messaging feed, and/or other considerations. In some implementations, a presentation frequency may be predetermined, set by a user, and/or determined in other ways.

In some implementations, a presentation frequency may be determined based on a frequency of communications entered and/or selected by users participating in the shared messaging feed. In some implementations, the presentation frequency may be the same as or similar to the user participation frequency, more than the user participation frequency, less than the user participation frequency, and/or other measure.

In some implementations, a presentation amount may include a total quantity of contextually relevant communications that may be presented in a shared messaging feed based on an individual selection of a messaging icon. In some implementations, a presentation amount may be determined based on an amount of communications entered and/or selected by one or more users participating in the shared messaging feed. In some implementations, the presentation amount may be the same as or similar to an individual user participation amount, more than an individual user participation amount, less than the user participation amount, and/or other measures.

In some implementations, one or more contextually relevant communications associated with a selected messaging icon may be determined and presented in a shared messaging feed in response to a context of a communication session indicating that a name of a chatbot associated with the selected messaging icon has been included in the shared messaging feed. By way of non-limiting illustration, if a user mentions a chatbot's name in a message, this mention may act as a trigger to determine and/or present a contextually relevant communication.

In some implementations, a user may provide input to cease presentation of contextually relevant communications. In some implementations, the user input may include entry and/or selection of a visual representation of a chatbot icon in a messaging feed and/or other entry and/or selection (also referred to as a "deselection").

By way of non-limiting illustration, in response to obtaining a selection of the first messaging icon, the updating component 108 may be configured to determine a contextually relevant communication based on context information, a first persona associated with the first messaging icon, and/or other information.

In some implementations, in response to obtaining a deselection of the first messaging icon, the updating component 108 may be configured to cease determining contextually relevant communications based on context information, a first persona associated with the first messaging icon, and/or other information.

In some implementations, context information may describe context of communications by one or more chatbots in a communication session. A contextually relevant communication for a given chatbot may be determined based on the context of communications by one or more other chatbots in a communication session. The contextually relevant communication may be responsive to the context of communications by one or more other chatbots in a communication session. In this manner, if multiple chatbots are in the conversation, the chatbots may interact with each other and/or with the users.

In FIG. 1, server(s) 102 may include one or more physical processors 104 configured to execute machine-readable instructions 105. The machine-readable instructions 105 may be stored in electronic storage 114, and/or other storage location. The machine-readable instructions 105 may include one or more of a user component 106, a receiving component 107, an updating component 108, and/or other components. The machine-readable instructions 105 may be executable by processor(s) 104 to facilitate interactions with mobile applications via messaging interfaces.

In some implementations, the user component 106 may be configured to access and/or manage one or more user profiles and/or user information associated with users of the computing platform 118 and/or one or more other computing platforms 134.

The receiving component 107 may be configured to receive messaging information describing messaging content entered and/or selected by users and/or messaging information describing contextually relevant communications.

In some implementations, messaging information describing messaging content may include information identifying a user and/or computing platform sending the messaging content, one or more users and/or computing platforms intended as recipients of the messaging content in accordance with a communication session, and/or other information. In some implementations, information describing messaging content may include information used to look up the messaging content from a database of messaging content. By way of non-limiting example, messaging information describing messaging content may include keys, identifiers, pointers, network addresses, and/or other information used by the receiving component 107 to look up the corresponding messaging content. By way of non-limiting illustration, users may enter and/or select messaging content at a computing platform. The computing platform may communicate, to the server(s) 102, identifiers that point to what the corresponding messaging content is. The identifiers and/or other messaging information may be received by the receiving component 107.

In some implementations, messaging information describing messaging content may include the messaging content and/or a representation (e.g., a copy) of the messaging content. By way of non-limiting illustration, users may enter and/or select messaging content at a computing platform. The computing platform may communicate, to the server(s) 102, a copy of the messaging content. The copy may be received by the receiving component 107.

The updating component 108 may be configured to effectuate updates of messaging feeds of messaging interfaces presented on the computing platforms based on the received messaging information. The updating component 108 may be configured such that updates may correspond to presenting instances of messaging content in the shared messaging feeds. In some implementations, effectuating updates may comprise communicating, to recipient computing platforms within a communication session, messaging information describing messaging content to be presented in a messaging feed of a messaging interface presented at the recipient computing platform 118. In some implementations, the communicated messaging information may comprise the messaging information received by the receiving component 107. By way of non-limiting example, the server(s) 102 may relay messaging content and/or information describing messaging content between computing platform within a communication session.

In some implementations, updating component 108 may be configured to determine context information, contextually relevant communication(s) based on context information, and/or other information described herein.

Figure 3:
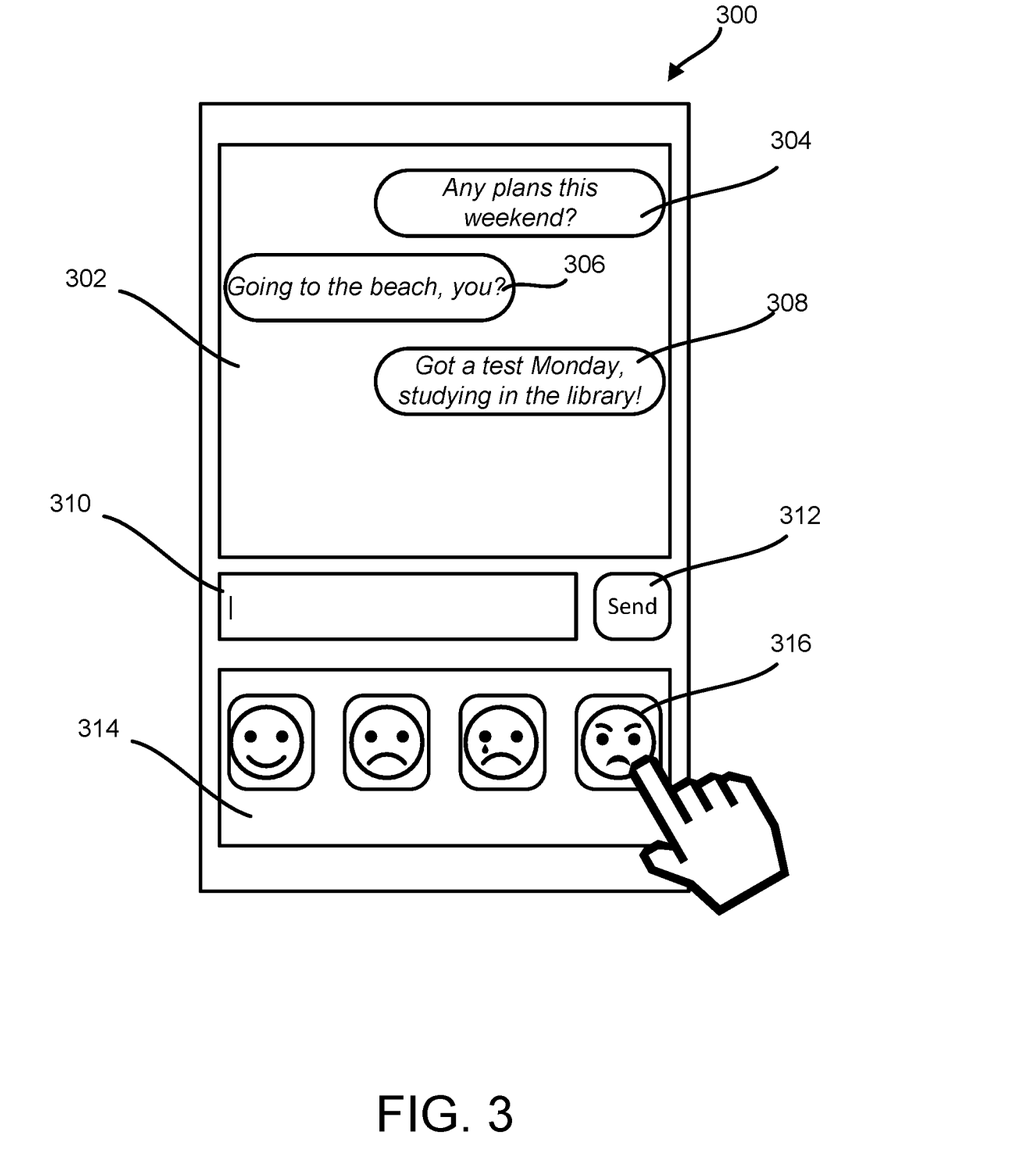
FIG. 3 illustrates a messaging interface, in accordance with one or more implementations.

FIG. 3 illustrates a messaging interface 300 displayed on a first computing platform associated with a first user, in accordance with one or more implementations. The messaging interface 300 may include one or more of a communication field 302, an assembly field 310, an entry field 314, and/or other components.

The communication field 302 may be configured to display a shared messaging feed that reflects a communication session between the first computing platform, a second computing platform associated with a second user, and/or other computing platforms. The shared messaging feed may include messaging content previously entered and/or selected by the users participating in the communication session. By way of non-limiting illustration, the shared messaging feed may include one or more of first content 304 entered and/or selected by the first user, second content 306 entered and/or selected by the second user, third content 308 entered and/or selected by the first user, and/or other messaging content. Context information describing a context of the communication session may be determined. The context of the communication session may include one or more of words, phrases, questions, answers, conveyed emotions, user presence, user absence, and/or other information. By way of non-limiting illustration, in the example of FIG. 3, the context information may describe that the first user and the second user are discussing weekend plans, with the second user responding that they are "Going to the beach" and the first user is "studying in the library."

The assembly field 310 assembly field may reflect messaging content entered and/or selected from the entry field 314. The assembly field 310 may show an assembly of the entered and/or selected messaging content based on sequential entry and/or selection of messaging content by a user.

The entry field 314 may display messaging content available for entry and/or selection. The entry field 314 may include a chatbot keyboard showing a set of chatbot icons available for entry and/or selection. The set of chatbot icons may include a first chatbot icon 316. The first chatbot icon 316 may be associated with a first persona and/or may be associated with a visual representation of the persona. The first persona may comprise, for illustrative purposes in FIG. 3, a persona of a character having a negative and/or angry demeanor.

Figure 4:
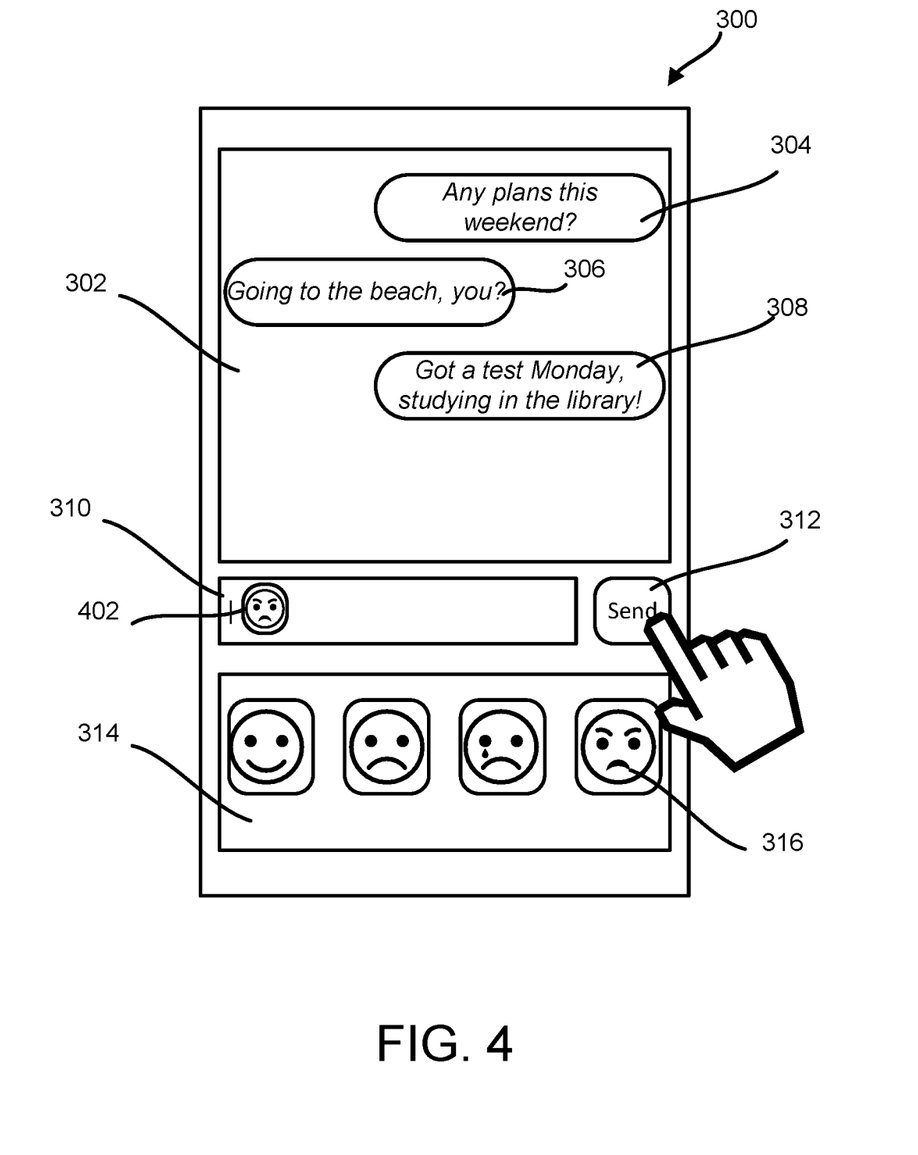
FIG. 4 illustrates a messaging interface, in accordance with one or more implementations.

FIG. 4 illustrates the messaging interface 300, in accordance with one or more implementations. In particular, upon user selection of the first chatbot icon 316, a representation 402 of the first chatbot icon 316 may be displayed in the assembly field 402 for preview. The first user may select an interface element 312 comprising a send button to enter the selection into the shared messaging feed in the communication field 302.

Figure 5:
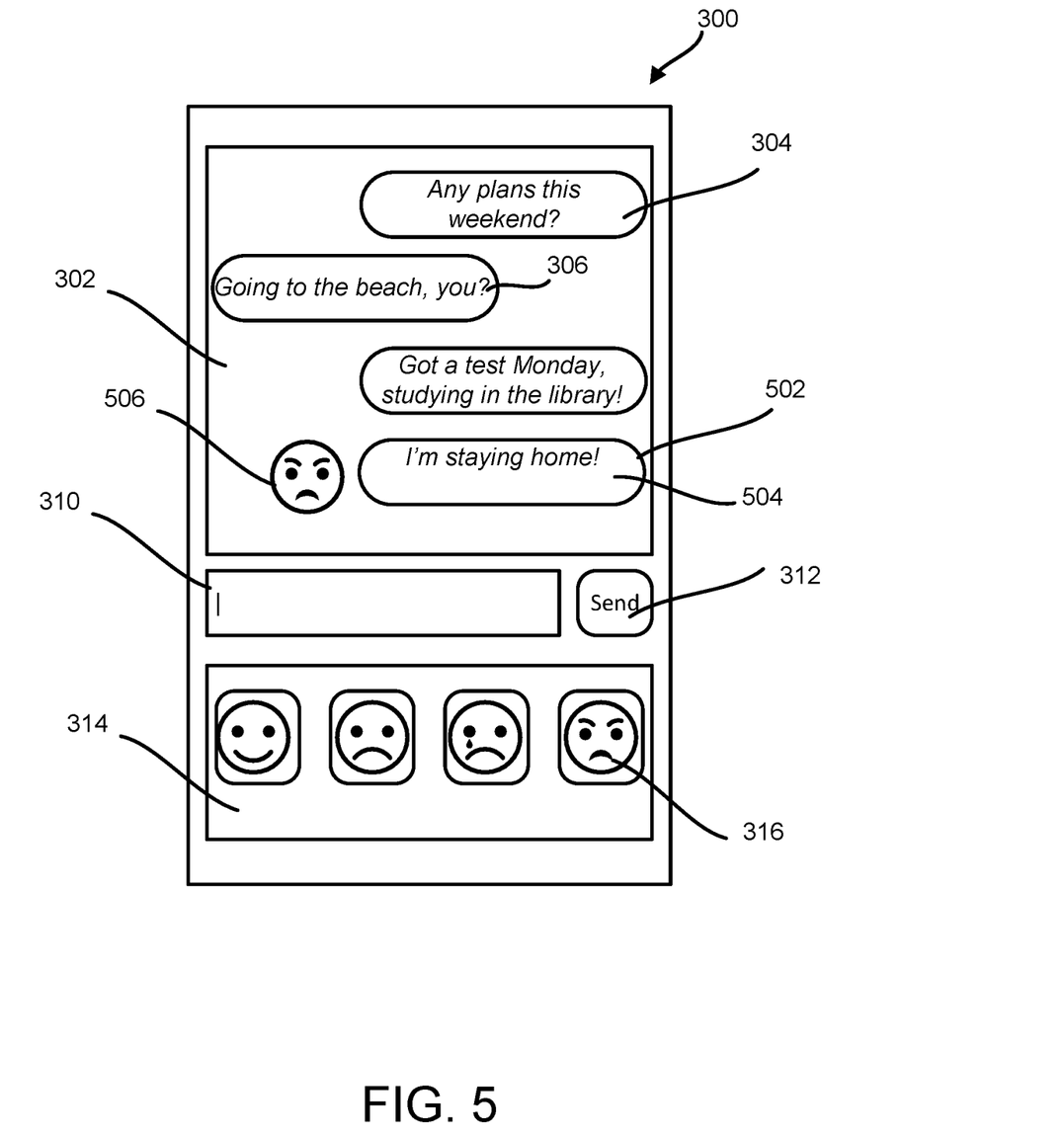
FIG. 5 illustrates a messaging interface, in accordance with one or more implementations.

FIG. 5 illustrates the messaging interface 300, in accordance with one or more implementations. In some implementations, in response to obtaining the selection of the first chatbot icon 316, a contextually relevant communication 502 may be determined based on one or more of the context information, the first persona of the first chatbot icon 316, and/or other information. The contextually relevant communication 502 may include one or more of a text message 504, a visual representation 506 of the first chatbot icon 316, and/or other content. The message 504 may be responsive to the context of the communication and/or reflect the first persona of the first chatbot icon 316. By way of non-limiting illustration, the message 504 may address the context, e.g., the discussion of weekend plans and may reflect the persona, e.g., negative and/or angry demeanor. For illustrative purposes, the message 504 may include "I'm staying home!".

Returning to FIG. 1, server(s) 102, computing platform 118, and/or external resources 120 may be operatively linked via one or more electronic communication links. For example, such electronic communication links may be established, at least in part, via a network (e.g., network(s) 116) such as the Internet and/or other networks. It will be appreciated that this is not intended to be limiting, and that the scope of this disclosure includes implementations in which server(s) 102, computing platform 118, and/or external resources 120 may be operatively linked via some other communication media.

The external resources 120 may include sources of information that are outside of system 100, external entities participating with system 100, and/or other resources. In some implementations, some or all of the functionality attributed herein to external resources 120 may be provided by resources included in system 100.

Computing platform 118 may include electronic storage 132, one or more processors 122, and/or other components. Computing platform 118 may include communication lines or ports to enable the exchange of information with network (s) 116, server(s) 102, one or more other computing platforms 134, and/or other entities. Illustration of computing platform 118 in FIG. 1 is not intended to be limiting. Computing platform 118 may include a plurality of hardware, software, and/or firmware components operating together to provide the functionality attributed herein to computing platform 118.

Server(s) 102 may include electronic storage 114, one or more processors 104, and/or other components. Server(s) 102 may include communication lines or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 114 and/or 132 may comprise electronic storage media that electronically stores information. The electronic storage media of the electronic storage 114 and/or 132 may include one or both of storage that is provided integrally (i.e., substantially non-removable) with the respective device and/or removable storage that is removably connectable to the respective device. Removable storage may include, for example, a port or a drive. A port may include a USB port, a firewire port, and/or other port. A drive may include a disk drive and/or other drive. Electronic storage 114 and/or 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private network, and/or other virtual storage resources). Electronic storage 114 and/or 132 may store files, software algorithms, information determined by processor(s) 104 and/or 122, respectively, and/or other information that enables the respective devices to function as described herein.

Processor(s) 104 is configured to provide information-processing capabilities in the server(s) 102. As such, processor(s) 104 may include one or more of a digital processor, an analog processor, a digital circuit designed to process information, an analog circuit designed to process information, a state machine, and/or other mechanisms for electronically processing information. Although the processor(s) 104 are shown in FIG. 1 as single entity within the server(s) 102, this is for illustrative purposes only. In some implementations, the processor(s) 104 may include one or more processing units. These processing units may be physically located within the same device or may represent processing functionality of a plurality of devices operating in coordination.

For example, processor(s) 104 may be configured to execute components 106, 107, and/or 108. Processor(s) 104 may be configured to execute components 106, 107, and/or 108 by software; hardware; firmware; some combination of software, hardware, and/or firmware; and/or other mechanisms for configuring processing capabilities on processor 104. It should be appreciated that, although components 106, 107, and/or 108 are illustrated in FIG. 1 as being co-located within a single processing unit, in implementations in which processor 104 includes multiple processing units, one or more of components 106, 107, and/or 108 may be located remotely from the other components. The description of the functionality provided by the different components 106, 107, and/or 108 described above is for illustrative purposes and is not intended to be limiting, as any of components 106, 107, and/or 108 may provide more or less functionality than is described. For example, one or more of components 106, 107, and/or 108 may be eliminated, and some or all of its functionality may be provided by other ones of components 106, 107, 108, and/or other components.

Processor(s) 122 are configured to provide information-processing capabilities in the computing platform 118. As such, processor(s) 122 may include one or more of a digital processor, an analog processor, a digital circuit designed to process information, an analog circuit designed to process information, a state machine, and/or other mechanisms for electronically processing information. Although the processor(s) 122 are shown in FIG. 1 as a single entity within the computing platform 118, this is for illustrative purposes only. In some implementations, the processor(s) 122 may include one or more processing units. These processing units may be physically located within the same device or may represent processing functionality of a plurality of devices operating in coordination.

For example, processor(s) 122 may be configured to execute components 124, 125, and/or 126. Processor(s) 122 may be configured to execute components 124, 125, and/or 126 by software; hardware; firmware; some combination of software, hardware, and/or firmware; and/or other mechanisms for configuring processing capabilities on processor 122. It should be appreciated that, although components 124, 125, and/or 126 are illustrated in FIG. 1 as being co-located within a single processing unit, in implementations in which processor(s) 122 includes multiple processing units, one or more of components 124, 125, and/or 126 may be located remotely from the other components. The description of the functionality provided by the different components 124, 125, and/or 126 described above is for illustrative purposes and is not intended to be limiting, as any of components 124, 125, and/or 126 may provide more or less functionality than is described. For example, one or more of components 124, 125, and/or 126 may be eliminated, and some or all of its functionality may be provided by other ones of components 124, 125, 126, and/or other components.

Figure 2:
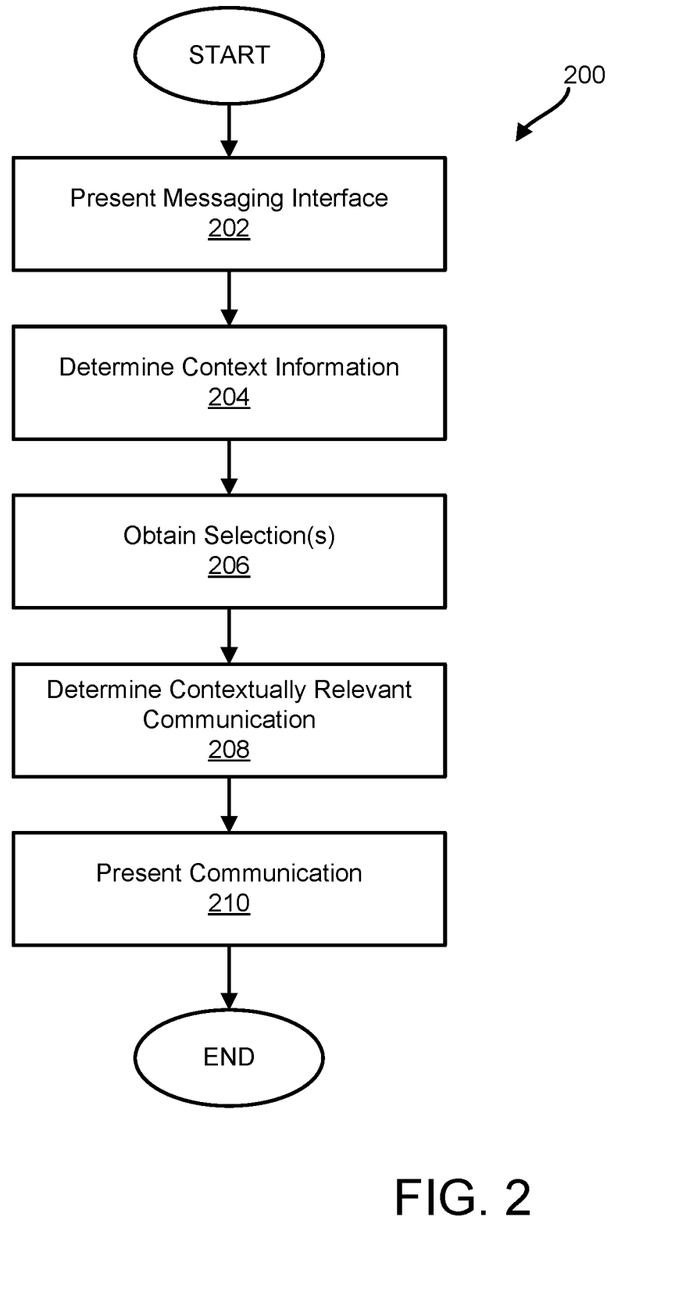
FIG. 2 illustrates a method to integrate artificial intelligence chatbots into a communication between real-world users, in accordance with one or more implementations.

FIG. 2 illustrates a method 200 to facilitate integrating artificial intelligence chatbots into a communication between real-world users, in accordance with one or more implementations. The operations of method 200 presented below are intended to be illustrative. In some implementations, method 200 may be accomplished with one or more additional operations not described and/or without one or more of the operations discussed. Additionally, the order in which the operations of method 200 are illustrated in FIG. 2 and described below is not intended to be limiting.

In some implementations, method 200 may be implemented in one or more processing devices (e.g., a computing platform, a sever, a digital processor, an analog processor, a digital circuit designed to process information, an analog circuit designed to process information, a state machine, and/or other mechanisms for electronically processing information) and/or one or more other components. The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a messaging interface may be presented via a first computing platform associated with a first user. The messaging interface may include one or more of an entry field, a communication field, and/or other components. The entry field may display messaging content available for entry and/or selection by the first user. The communication field may display a shared messaging feed that reflects a communication session between the first computing platform, a second computing platform associated with a second user, and/or other computing platforms. In some implementations, operation 202 may be performed by a messaging component the same as or similar to messaging component 125 (shown in FIG. 1 and described herein).

At an operation 204, context information and/or other information may be determined. The context information may describe a context of the communication session. In some implementations, operation 204 may be performed by a messaging component the same as or similar to messaging component 125 (shown in FIG. 1 and described herein).

At an operation 206, selection of one or more messaging icons may be obtained. By way of non-limiting illustration, a selection of a first messaging icon may be obtained via the entry field. In some implementations, operation 206 may be performed by one or more computer program components that is/are the same as or similar to messaging component 125 and/or receiving component 107 (shown in FIG. 1 and described herein).

At an operation 208, in response to obtaining selection of messaging icon(s), contextually relevant communication(s) may be determined based on context information and/or other information. In some implementations, operation 208 may be performed by one or more computer program components that is/are the same as or similar to updating component 126 and/or 108 (shown in FIG. 1 and described herein).

At an operation 210, contextually relevant communication(s) may be presented in the communication field. The presentation may cause an update of the shared messaging feed such that the contextually relevant communication(s) may be presented in the shared messaging feed as shown on one or more of the first computing platform, the second computing platform, and/or other computing platforms. In some implementations, operation 210 may be performed by one or more computer program components that is/are the same as or similar to updating component 126 and/or 108 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A non-transitory machine-readable storage medium having instructions embodied thereon, the instructions being executable by one or more processors to perform a method to integrate non-user entities into a communication session between real-world users, the method comprising:

presenting a messaging interface via a first computing platform associated with a first user, the messaging interface including an entry field and a communication field, the entry field displaying messaging content available for entry and/or selection by the first user, the communication field displaying a shared messaging feed that reflects a communication session between the first computing platform and a second computing platform associated with a second user;

determining context information, the context information describing a context of the communication session;

obtaining a selection of a first messaging icon by the first user via the entry field, wherein the first messaging icon is associated with a first persona such that the first messaging icon is a visual representation of the first persona;

in response to obtaining the selection of the first messaging icon by the first user, determining a first contextually relevant communication for a non-user entity based on the context information and presenting the first contextually relevant communication in the communication field, wherein the non-user entity is integrated into the communication session along with the first contextually relevant communication such that the non-user entity participates in the communication session with the first user and the second user, the presentation of the non-user entity along with the first contextually relevant communication causing a first update of the shared messaging feed such that the non-user entity along with the first contextually relevant communication are presented in the shared messaging feed as shown on the first computing platform and the second computing platform, wherein the first contextually relevant communication is presented in the shared messaging feed in association with the non-user entity such that the first contextually relevant communication is distinctively associated with the non-user entity separate from the messaging content associated with the first user and the second user, and wherein the non-user entity is presented to also include the visual representation of the first persona;

determining a second contextually relevant communication for the non-user entity based on the context information and an emotional demeanor associated with the first persona so that content of the second contextually relevant communication reflects the emotional demeanor; and presenting the second contextually relevant communication in the communication field, wherein the presentation of the second contextually relevant communication is performed automatically and absent further input by the first user or the second user prompting the presentation of the second contextually relevant communication, the presentation of the second contextually relevant communication causing a second update of the shared messaging feed such that the second contextually relevant communication is presented in the shared messaging feed as shown on the first computing platform and the second computing platform, and wherein the second contextually relevant communication is presented in the shared messaging feed in association with the non-user entity such that the second contextually relevant communication is distinctively associated with the non-user entity separate from the messaging content associated with the first user and the second user.

2. The non-transitory machine-readable storage medium of claim 1, wherein the communication session includes exchanges of one or more of text-based messages, emoticons, GIFS, images, or video.

3. The non-transitory machine-readable storage medium of claim 1, wherein the context of the communication session includes one or more of words, phrases, questions, answers, conveyed emotions, user presence, or user absence.

4. The non-transitory machine-readable storage medium of claim 1, wherein the first contextually relevant communication includes an answer which is responsive to a question posed in the messaging content associated with the first user and/or the second user, and the second contextually relevant communication includes a conversational message relevant to the context of the communication session.

5. The non-transitory machine-readable storage medium of claim 4, wherein the answer responds to the question, and the conversational message is a comment to a conversation determined from the context of the communication session.

6. The non-transitory machine-readable storage medium of claim 1, wherein the first persona is representative of one or more of a movie character, a cartoon character, a game character, or a real-world person.

7. The non-transitory machine-readable storage medium of claim 6, wherein the emotional demeanor includes one or more of happy, sad, rude, or funny.

8. The non-transitory machine-readable storage medium of claim 1, wherein the method further comprises:
  updating the communication session based on further entry and/or selection of the messaging content by the first user and/or the second user;
  updating the context information such that the context of the communication session reflects the further entry and/or selection of the messaging content by the first user and/or the second user;
  determine a third contextually relevant communication based on the updating of the context information; and
  effectuate presentation of the third contextually relevant communication in the communication field.

9. A system configured to integrate non-user entities into a communication session between real-world users, the system comprising:
  one or more physical processors configured by machine-readable instructions to:
    effectuate presentation of a messaging interface via a first computing platform associated with a first user, the messaging interface including an entry field and a communication field, the entry field displaying messaging content available for entry and/or selection by the first user, the communication field displaying a shared messaging feed that reflects a communication session between the first computing platform and a second computing platform associated with a second user;
    determine context information, the context information describing a context of the communication session;
    obtain a selection of a first messaging icon by the first user via the entry field, wherein the first messaging icon is associated with a first persona such that the first messaging icon is a visual representation of the first persona;
    in response to obtaining the selection of the first messaging icon by the first user, determine a first contextually relevant communication for a non-user entity based on the context information and presenting the first contextually relevant communication in the communication field, wherein the non-user entity is integrated into the communication session along with the first contextually relevant communication such that the non-user entity participates in the communication session with the first user and the second user,
    the presentation of the non-user entity along with the first contextually relevant communication causing a first update of the shared messaging feed such that the non-user entity along with the first contextually relevant communication are presented in the shared messaging feed as shown on the first computing platform and the second computing platform, wherein the first contextually relevant communication is presented in the shared messaging feed in association with the non-user entity such that the contextually relevant communication is distinctively associated with the non-user entity separate from the messaging content associated with the first user and the second user, and wherein the non-user entity is presented to also include the visual representation of the first persona;
    determine a second contextually relevant communication for the non-user entity based on the context information and an emotional demeanor associated with the first persona so that content of the second contextually relevant communication reflects the emotional demeanor; and
    effectuate presentation of the second contextually relevant communication in the communication field, wherein the presentation of the second contextually relevant communication is performed automatically and absent further input by the first user or the second user prompting the presentation of the second contextually relevant communication, the presentation of the second contextually relevant communication causing a second update of the shared messaging feed such that the second contextually relevant communication is presented in the shared messaging feed as shown on the first computing platform and the second computing platform, and wherein the second contextually relevant communication is presented in the shared messaging feed in association with the non-user entity such that the second contextually relevant communication is distinctively associated with the non-user entity separate from the messaging content associated with the first user and the second user.

10. The system of claim 9, wherein:
  the context of the communication session includes one or more of words, phrases, questions, answers, conveyed emotions, user presence, or user absence;
  the first contextually relevant communication includes an answer which is responsive to a question posed in the messaging content associated with the first user and/or the second user;
  the second contextually relevant communication includes a conversational message relevant to the context of the communication session;
  the answer responds to the question; and
  the conversational message is a comment to a conversation determined from the context of the communication session.

11. A method to integrate artificial intelligence chatbots into a communication between real-world users, the method comprising:
  presenting a messaging interface via a first computing platform associated with a first user, the messaging interface including an entry field and a communication field, the entry field displaying messaging content available for entry and/or selection by the first user, the communication field displaying a shared messaging feed that reflects a communication session between the first computing platform and a second computing platform associated with a second user;
  determining context information, the context information describing a context of the communication session;
  obtaining a selection of a first messaging icon by the first user via the entry field, wherein the first messaging icon is associated with a first persona such that the first messaging icon is a visual representation of the first persona;

in response to obtaining the selection of the first messaging icon by the first user, determining a first contextually relevant communication for a non-user entity based on the context information and presenting the first contextually relevant communication in the communication field, wherein the non-user entity is integrated into the communication session along with the first contextually relevant communication such that the non-user entity participates in the communication session with the first user and the second user, the presentation of the non-user entity along with the first contextually relevant communication causing a first update of the shared messaging feed such that the non-user entity along with the first contextually relevant communication is presented in the shared messaging feed as shown on the first computing platform and the second computing platform, wherein the first contextually relevant communication is presented in the shared messaging feed in association with the non-user entity such that the first contextually relevant communication is distinctively associated with the non-user entity separate from the messaging content associated with the first user and the second user, and wherein the non-user entity is presented to also include the visual representation of the first persona;

determining a second contextually relevant communication for the non-user entity based on the context information and an emotional demeanor associated with the first persona so that content of the second contextually relevant communication reflects the emotional demeanor; and presenting the second contextually relevant communication in the communication field, wherein the presentation of the second contextually relevant communication is performed automatically and absent further input by the first user or the second user prompting the presentation of the second contextually relevant communication, the presentation of the second contextually relevant communication causing a second update of the shared messaging feed such that the second contextually relevant communication is presented in the shared messaging feed as shown on the first computing platform and the second computing platform, and wherein the second contextually relevant communication is presented in the shared messaging feed in association with the non-user entity such that the second contextually relevant communication is distinctively associated with the non-user entity separate from the messaging content associated with the first user and the second user.

12. The method of claim 11, wherein the communication session includes exchanges of one or more of text-based messages, emoticons, GIFS, images, or video.

13. The method of claim 11, wherein the context of the communication session includes one or more of words, phrases, questions, answers, conveyed emotions, user presence, or user absence.

14. The method of claim 11, wherein the first contextually relevant communication includes an answer which is responsive to a question posed in the messaging content associated with the first user and/or the second user, and the second contextually relevant communication includes a conversational message relevant to the context of the communication session.

15. The method of claim 14, wherein the answer responds to the question, and the conversational message is a comment to a conversation determined from the context of the communication session.

16. The method of claim 11, wherein the first persona is representative of one or more of a movie character, a cartoon character, a game character, or a real-world person.

17. The method of claim 16, wherein the emotional demeanor includes one or more of happy, sad, rude, or funny.

18. The method of claim 11, wherein the method further comprises:
updating the communication session based on further entry and/or selection of the messaging content by the first user and/or the second user;
updating the context information such that the context of the communication session reflects the further entry and/or selection of the messaging content by the first user and/or the second user;
determine a third contextually relevant communication based on the updating of the context information; and
effectuate presentation of the third contextually relevant communication in the communication field.

* * * * *